(12) United States Patent
Arimilli et al.

(10) Patent No.: US 6,701,416 B1
(45) Date of Patent: Mar. 2, 2004

(54) CACHE COHERENCY PROTOCOL WITH TAGGED INTERVENTION OF MODIFIED VALUES

(75) Inventors: Ravi Kumar Arimilli, Austin, TX (US); John Steven Dodson, Pflugerville, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/024,620

(22) Filed: Feb. 17, 1998

(51) Int. Cl.[7] .............................................. G06F 12/00
(52) U.S. Cl. ...................................................... 711/141
(58) Field of Search ................................. 711/119, 122, 711/141, 143

(56) References Cited

U.S. PATENT DOCUMENTS

| | | | |
|---|---|---|---|
| 4,755,930 A | * 7/1988 | Wilson, Jr. et al. | 711/122 |
| 5,671,391 A | 9/1997 | Knotts | 395/470 |
| 5,749,095 A | * 5/1998 | Hagersten | 711/141 |
| 5,832,276 A | * 11/1998 | Feiste et al. | 710/240 |
| 5,903,908 A | * 5/1999 | Singh et al. | 711/122 |
| 5,946,709 A | * 8/1999 | Arimilli et al. | 711/119 |

* cited by examiner

*Primary Examiner*—Donald Sparks
*Assistant Examiner*—C. P. Chace
(74) *Attorney, Agent, or Firm*—Volel Emile; Thomas E. Tyson; Bracewell & Patterson, L.L.P.

(57) ABSTRACT

A cache coherency protocol uses a "Tagged" coherency state to track responsibility for writing a modified value back to system memory, allowing intervention of the value without immediately writing it back to system memory, thus increasing memory bandwidth. The Tagged state can migrate across the caches (horizontally) when assigned to a cache line that has most recently loaded the modified value. Historical states relating to the Tagged state may further be used. The invention may also be applied to a multi-processor computer system having clustered processing units, such that the Tagged state can be applied to one of the cache lines in each group of caches that support separate processing unit clusters. Priorities are assigned to different cache states, including the Tagged state, for responding to a request to access a corresponding memory block. Any tagged intervention response can be forwarded only to selected caches that could be affected by the intervention response, using cross-bars. The Tagged protocol can be combined with existing and new cache coherency protocols. The invention further contemplates independent optimization of cache operations using the Tagged state.

20 Claims, 4 Drawing Sheets

CACHE COHERENCY PROTOCOL WITH TAGGED INTERVENTION OF MODIFIED VALUES

BACKGROUND OF THE INVENTION

1. Field of the Invention

The present invention generally relates to computer systems, and more particularly to a cache coherency protocol which provides a novel coherency state for modified data allowing improvements in cache intervention without requiring writing of the intervened data to system memory.

2. Description of the Related Art

The basic structure of a conventional multi-processor computer system 10 is shown in FIG. 1. Computer system 10 has several processing units, two of which 12a and 12b are depicted, which are connected to various peripheral devices, including input/output (I/O) devices 14 (such as a display monitor, keyboard, graphical pointer (mouse), and a permanent storage device (hard disk)), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory access channels (not shown). Computer system 10 may have many additional components which are not shown, such as serial and parallel ports for connection to, e.g., modems or printers. There are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches. If a block is present in the L1 cache of a given processing unit, it is also present in the L2 and L3 caches of that processing unit. This property is known as inclusion. Henceforth, it is assumed that the principle of inclusion applies to the caches related to the present invention.

In an SMP computer, it is important to provide a coherent memory system, that is, to cause write operations to each individual memory location to be serialized in some order for all processors. For example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Virtually all coherency protocols operate only to the granularity of the size of a cache block. That is to say, the coherency protocol controls the movement of and write permissions for data on a cache block basis, and not separately for each individual memory location (hereinafter, the term "data" is used to refer to a memory value that is either a numeric value which is used by the program or a value that corresponds to a program instruction).

There are a number of protocols and techniques for achieving cache coherence that are known to those skilled in the art. All of these mechanisms for maintaining coherency require that the protocols allow only one processor to have a "permission" that allows a write operation to a given memory location (cache block) at any given point in time. As a consequence of this requirement, whenever a processing element attempts to write to a memory location, it must first inform all other processing elements of its desire to write the location and receive permission from all other processing elements to carry out the write.

To implement cache coherency in a system, the processors communicate over a common generalized interconnect (i.e., bus 20). The processors pass messages over the interconnect indicating their desire to read from or write to memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current)

value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block requested by processing unit in its L1 cache, and the value in that block is modified, by the principle of inclusion the L2 cache and any lower level caches also have copies of the block (however, their copies are stale, since the copy in the processor's cache is modified). Therefore, when the lowest level cache (e.g., L3) of the processing unit snoops the read operation, it will determine that the block requested is present and modified in a higher level cache. When this occurs, the L3 cache places a message on the generalized interconnect informing the processing unit that it must "retry" its operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory or both, depending on the exact details of the implementation. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified value has been retrieved from the L1 cache of a processing unit and placed into system memory, and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

The key point is that when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retired later. If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write the block without first communicating with other processing units in the system because no other processing unit has a copy of the block. Therefore, it is possible for a processor to read or write a location without first communicating this intention onto the interconnection, but only where the coherency protocol has insured that no other processor has an interest in the block.

The foregoing cache coherency technique is implemented in a specific protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache. As seen in FIG. 2, if a sector is in any of the Modified, Shared or Invalid states, it can move between the states depending upon the particular bus transaction. While a sector in an Exclusive state can move to any other state, a sector can only become Exclusive if it is first Invalid.

A further improvement in accessing cache blocks can be achieved using the cache coherency protocol. This improvement, referred to as "intervention," allows a cache having control over a memory block to provide the data in that block directly to another cache requesting the value (for a read-type operation), in other words, bypassing the need to write the data to system memory and then have the requesting processor read it back again from memory. Intervention can only be performed by a cache having the value in a block whose state is Modified or Exclusive. In both of these states, there is only one cache block that has a valid copy of the value, so it is a simple matter to source (write) the value over the bus 20 without the necessity of first writing it to system memory. The intervention procedure thus speeds up processing by avoiding the longer process of writing to and reading from system memory (which actually involves three bus operations and two memory operations). This procedure not only results in better latency, but also increased bus bandwidth.

As part of intervention procedure, the memory controller for the system memory will also receive the intervention response from a cache line having a Modified state, so that the memory controller knows to read the modified data in a parallel fashion when it is sourced to the other processor. At the end of the procedure, the cache which held the data in the Modified state will switch to the Shared state, and the other processor's cache block will go from the Invalid state to the Shared state as well, since the modified data will have been copied to system memory. In conventional cache coherency protocols, the modified data must be written to system memory upon intervention and, while this may be done in a parallel fashion to speed up processing, it still may be unnecessary in many instances. For example, if a modified cache block in a first processor is used to source data to a cache in a second processor, the second processor may very well further modify the data, which will ultimately require another write operation to system memory. If no other processors required that data (memory block) during the time between sourcing of the data by the first processor and modification of the data by the second processor, then the first write operation to system memory (part of the intervention procedure) is superfluous.

One scheme avoids unnecessary writes to system memory by forcing the second processor to hold the sourced data in a Modified state, even if the processor only wanted the data for a read operation. In this manner, the second processor becomes responsible for writing the data back to system memory in the future. The main problem with this implementation, however, is that the intervening (first) processor must set its cache line to an Invalid state, so there can be no sharing of the data; only one processor can read it at any one time, and the data must always move back and forth between processors, causing excess bus traffic. It would, therefore, be desirable to devise a method of maintaining cache coherency which allowed for efficient intervention of data but avoided unnecessary write operations to system memory. It would be further advantageous if the method would allow modified data to move from cache to cache without affecting memory while allowing the data to be shared.

SUMMARY OF THE INVENTION

It is therefore one object of the present invention to provide an improved method of maintaining cache coherency in a multi-processor computer system.

It is another object of the present invention to provide such a method that allows for cache intervention but avoids unnecessary write operations to system memory.

It is yet another object of the present invention to provide such a method that allows intervention of modified data while allowing the data to be held by several different caches in a shared state.

The foregoing objects are achieved in a method of maintaining cache coherency in a multi-processor computer system, using a "Tagged" coherency state to indicate that a particular cache line contains a modified value (that is, a value which is not consistent with the corresponding memory block in the system memory device) and this cache line is responsible, at least currently, for writing the modified value back to the system memory device (or elsewhere in the memory hierarchy, i.e., through intervention). All other cache lines (which support other processing units in the system) that contain a copy of the modified value are assigned a second coherency state (Shared) which also indicates that these lines contain the modified value, but these lines are not responsible for ensuring that the system memory is eventually updated with the modified value. This Tagged state can migrate across the caches (horizontally), when it is assigned to the cache line that has most recently loaded the modified value. Historical coherency states may further be used to indicate that a particular cache line contains the modified value and has most recently sourced it, so that the "primary" Tagged cache line can be relieved of write-back responsibility by switching the "secondary" historical state cache line to the Tagged state when the existing Tagged cache line is, e.g., evicted as a result of a least-recently used algorithm.

The invention can also be applied to a multi-processor computer system having a plurality of processing units grouped into clusters, with multiple cache levels supporting a given cluster, such that the Tagged coherency state can be applied to one of the cache lines in each group of caches that support separate processing unit clusters. The Tagged state can be implemented in the lower level(s) of such a clustered system as well.

In a preferred embodiment, each coherency state used by the present invention has an associated priority such that, when a request is made to access a block, only the response with the highest priority is forwarded to the requesting processing unit. Any tagged intervention response can be forwarded only to selected caches that could be affected by the intervention response, using cross-bars.

The Tagged protocol can be combined with other cache coherency protocols, such as one which includes a "Recent" state to indicate that a cache contains a copy of a value which has been most recently accessed, allowing shared intervention. The "T" state may further be used to assign a collision priority which overrides conflicting requests from other caches to claim a memory block (a DClaim operation). The three functions of (i) intervention of data, (ii) tracking responsibility for writing modified data to the memory hierarchy, and (iii) providing DClaim collision priority, need not be combined in the single Tagged state, but can be independently carried out using a more complicated implementation of the invention.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
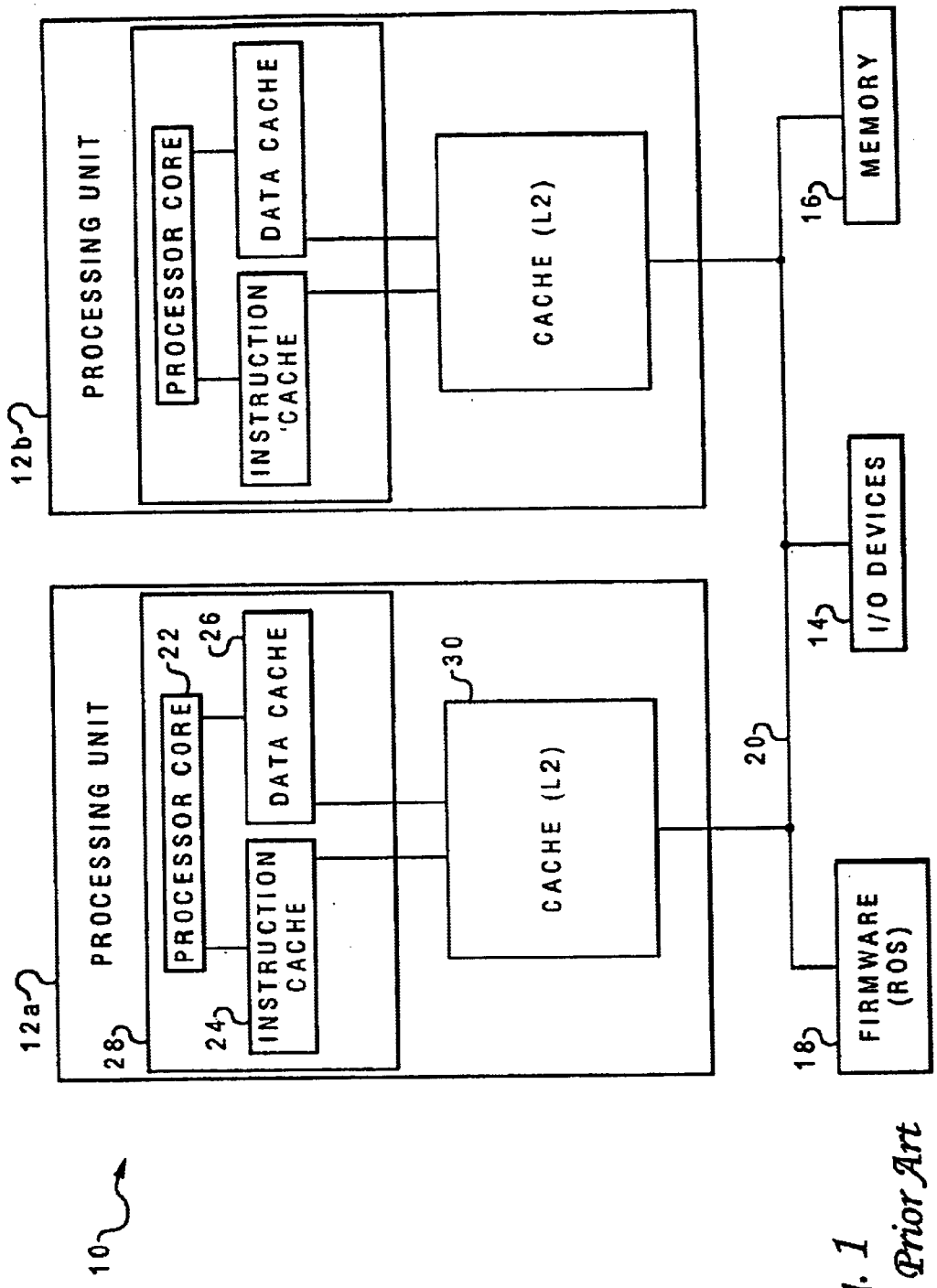
FIG. 1 is a block diagram of a prior-art multi-processor computer system.

The present invention is directed to a method of maintaining cache coherency in a multi-processor system, such as the system of FIG. 1, but the present invention could be applied to computer systems that are not necessarily conventional, i.e., they could include new hardware components not shown in FIG. 1, or have a novel interconnection architecture for existing components. Therefore, those skilled in the art will appreciate that the present invention is not limited to the generalized system shown in that figure.

Figure 3:
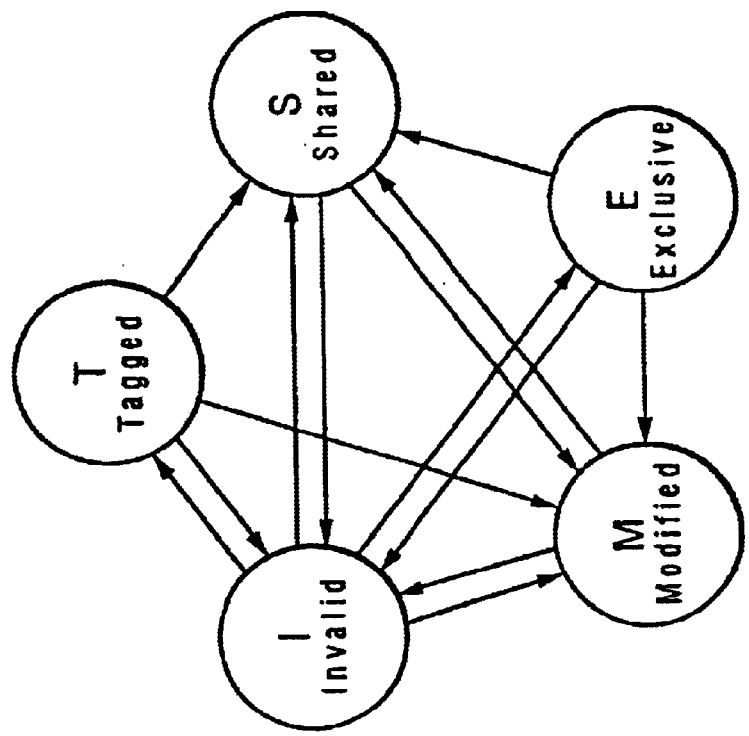
FIG. 3 is a state diagram depicting the cache coherency protocol of the present invention, providing a tagged state for modified data allowing intervention without requiring writing of the data to system memory.
Figure 2:
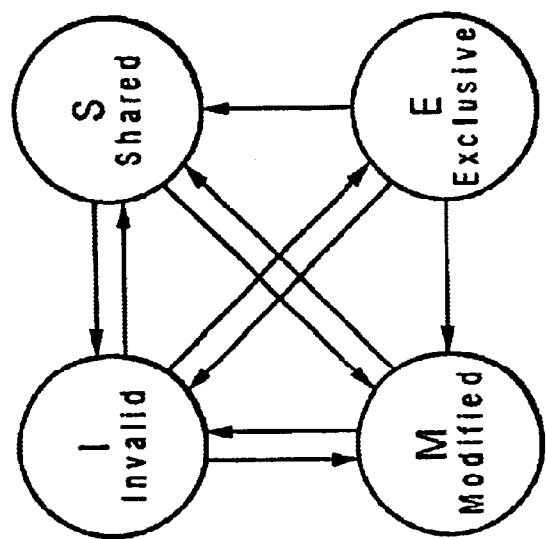
FIG. 2 is a state diagram depicting a prior art cache coherency protocol (MESI)

With reference now to FIG. 3, there is depicted a state diagram of one embodiment of the cache coherency protocol of the present invention. This protocol is similar to the prior art MESI protocol of FIG. 2, in that it includes the same four prior states (Modified, Exclusive, Shared and Invalid), but it also includes a new "T" state (Tagged), for providing an indication that a cache block has been modified by some processor but has not yet been written to system memory. For example, when a cache block is in a modified state in one processor, and a read operation is requested by a different processor, then the first processor would send a modified intervention response, and the reading processor can thereafter hold the data in the T state (the first processor switches from Modified to Shared). This operation can be repeated with additional processors such that the cache which has most recently read a copy of the modified data is the cache holding the value in the T state, and all other processors having a copy of the value hold it in the Shared state. In this manner, one cache is "tagged" to indicate that it is currently responsible for writing the modified data to the memory hierarchy at some time in the future, if necessary, whether by sourcing to another cache during a modified intervention response, or writing back to system memory. This approach reduces the overall number of write operations to system memory.

In the prior art MESI protocol, a cache which reads a copy of a modified value would switch from the Invalid state to the Shared state (rather than to the T state), and the modified intervention response would also be picked up by the memory controller to allow the data to be written to memory. In the basic protocol of the present invention, referred to herein as the "T-MESI" protocol, the memory controller ignores the transaction, freeing up memory bandwidth. A modified value is written to system memory only when required, e.g., as a result of a least-recently used (LRU) cache deallocation algorithm.

As with the prior art protocol, the four M-E-S-I states may change based on the initial state of the entry and the type of access sought by the requesting processor. The manner in which these four states change is generally identical to the prior art MESI protocol, with the following additions. As seen in FIG. 3, a cache line can also go from an Invalid state to a Tagged state, from a Tagged state to a Invalid state, and from a Tagged state to a Shared state. This embodiment of the T-MESI protocol may further be understood with reference to Table 1 which illustrates the cache coherency states for a particular cache block in three different processors, $P_0$, $P_1$, and $P_2$:

TABLE 1

|  | $P_0$ | $P_1$ | $P_2$ |
|---|---|---|---|
| Initial States | I | I | I |
| $P_0$ RWITM | M | I | I |
| $P_1$ Read | S | T | I |
| $P_2$ Read | S | S | T |
| Snoop Push ($P_1$ DClaim) | S | S | I |
| $P_1$ DClaim (after retry) | I | M | I |

In the first row, all three processors start off with the cache blocks in Invalid states. In the second row, processor $P_0$ executes a read-with-intent-to-modify operation (RWITM), and so its cache line goes from Invalid to Modified. Thereafter, processor $P_1$ requests a read of the cache line; processor $P_0$ intervenes, switches to the Shared state, and processor $P_1$ goes from the Invalid state to the Tagged state (the third row of Table 1). Later, processor $P_2$ requests a read of the cache line; processor $P_1$ intervenes, switches to the Shared state, and processor $P_2$ goes from the Invalid state to the Tagged state (the fourth row of Table 1).

Table 1 further illustrates how a cache line in the T state might be forced to write the data to system memory even though the line has not been deallocated. Some processor architectures, including the PowerPC™ processor, allow execution of a special instruction, other than the RWITM instruction, when a processor wants permission to write to a block. The "DClaim" instruction is one example. In the fifth line of Table 1, processor $P_1$ has transmitted a request for a DClaim of the particular cache line; processor $P_2$ snoops the DClaim, sends a retry message, and attempts a push of the data to system memory. Once the push is complete that cache line goes from Tagged to Invalid, but the cache line in processors $P_0$ and $P_1$ stays Shared. After the retry, processor $P_2$ will issue the DClaim again, which will not be further retried, and so the cache line will go Invalid in $P_0$, and become Modified in $P_1$.

It is possible that some modified value will migrate about the caches but never actually be written to system memory. Consider, for example, a processor requesting a RWITM of a value already held in the T state—all corresponding cache lines in other processors which are held in the Shared state, as well as the cache line in the T state, will switch to Invalid after the value has been sourced via intervention using the cache which "owned" the value (the cache in the T state). The new processor which executed the RWITM is set to the Modified state, and so the value which had previously been held in the T state was never written to system memory.

The T state has qualities of both the Shared state (since the data is held in a shared state in one or more other processors) and the Modified state (since the data has been modified and not yet written back to system memory). Indeed, from a CPU perspective the T state is equivalent to the S state, but from a system bus perspective, a cache line with a T state is essentially treated like a Modified block.

In the embodiment of FIG. 3, the "T" state migrates between cache lines, but in an alternative embodiment, the "T" state stays with the cache line of the original processor that modified the value. In other words, a cache line that holds a value in the Modified state would switch to the Tagged state upon sourcing the data to another processor (rather than to the Shared state). The state diagram for this alternative embodiment would be similar to FIG. 3, except that a cache line in the Modified state could go to the Tagged state but not to the Shared state. Such an alternative embodiment may be desirable in certain constructions in order to "age out" the value from the cache. For example, if the cache is multi-level (at least to L3), then by pushing the value from the L2 cache to the L3 cache, the value can be sourced later to other L3 caches more quickly than if the system had to wait to retrieve it from the L2 level instead. This pushing of the value can occur in a background manner, e.g., as a result of LRU deallocation, not in response to a specific bus operation, and so can result in more efficient overall operation.

In the present invention, the protocol can be established to pass particular coherency responses to a processor requesting a read operation, from the snoopers of all caches associated with other processors in a multi-processor computer system. The responses for one embodiment of the invention are formulated in accordance with Table 2:

TABLE 2

| Address Response | Priority | Definition |
| --- | --- | --- |
| 000 | — | <reserved> |
| 001 | 3 (1) | Shared Intervention |
| 010 | 6 | Remote Status |
| 011 | 4 | Rerun |
| 100 | 1 (2) | Retry |
| 101 | 2 (3) | Tagged Intervention |
| 110 | 5 | Shared |
| 111 | 7 | Null or Clean |

The signals take the form of a 3-bit snoop response, whose value (address response) and definition are set forth in Table 2. These signals are encoded to indicate the snoop result after the address tenure. Table 2 shows responses for a shared line and a clean (invalid) line, as well as a retry response; these three responses are essentially known in the prior art. Table 2 also shows four new responses, "tagged intervention," "shared intervention," "remote status" and "rerun." The tagged intervention response is used when a cache block holds a value in either the Modified or Tagged state, indicating that it can intervene the value, but the new cache block requesting the value must become temporarily responsible for copying it back to the system memory (different responses can be provided for Modified vs. Tagged blocks, if desired, as discussed below with the selective implementation of the "T" state).

The other three responses are not directly related to the present invention. The shared intervention response allows a block holding a valid copy of the value to source it (see the R-MESI protocol discussed below). The remote status response, which is only used for read operations, is used to indicate that the read will be successful, and the coherency response of either Shared or Exclusive will be returned later with the data using another signal. The rerun response is used when the coherency response cannot be determined immediately and the request must be forwarded lower in the hierarchy. The rerun response differs from retry in that the former message must be reissued and it must have the same identifier so it can be matched up with the previously forwarded message.

A priority value may further be associated with each response to allow system logic to determine which of the responses should take priority in formulating a single response to the requesting processor, as shown in Table 2. For example, if one or more caches respond with a tagged response (priority 2), and one or more caches respond with a retry response (priority 1), then the retry response will take priority and the system logic will issue the retry response to the requesting processor. This system logic may reside in various components, such as a system control point unit, or even within the memory controller.

The primary values shown for priorities in Table 2 provide the highest priority for the retry response. However, an alternative priority scheme may be provided to enhance the use of the T-MESI protocol. In this alternative, indicated by the priority numbers in parentheses in Table 2, the shared intervention response has the highest priority, followed by the retry response, and further followed by the tagged intervention response; all other priorities are the same as with the first scheme. In this alternate scheme, a shared intervention response will always override other responses, which is acceptable for many reasons. First of all, if a cache line is holding a value (data or instruction) in the below-described "R" state (used for shared intervention), then no other caches may hold a value corresponding to the same address in a modified or tagged state, and so it is clear that no other caches will be able to respond with a tagged intervention response. Also, if any other cache issues a retry, then any later response from that same cache based on the retry could at most be shared, which again means that it is acceptable to issue the shared intervention response in the first place.

The present invention can be selectively implemented in computer systems which have some caches that support the T-MESI protocol and other caches which do not support this protocol. For example, a multi-processor computer system may initially be manufactured and sold with four processing units mounted on the system circuit board, but having another four sockets allowing later addition of other processing units. The original processing units (or their cache controllers) may be less expensive and accordingly not provide support for the T-MESI protocol, even though the system logic (system control point unit) supports this protocol. These original processing units can, however, inexpensively be provided with means to indicate whether they support the protocol, such as by the use of single-bit flag, which informs the system logic of the presence or absence of T-MESI support. Then, if new processing units are added to the sockets which have caches that do support the T-MESI protocol, then the system logic can distinguish between these caches using the flag, and make use of the protocol with the appropriate processing units.

To further explain the foregoing, consider a system which has several processing units that support the T-MESI protocol and several processing units that do not. When each unit issues a read request, the request includes the flag which identifies T-MESI support. If a value is held in a cache line in the Modified state (by either type of processing unit) and that value is requested by a processing unit that does not support the T-MESI protocol, then the system logic will forward a modified intervention response to the requesting processor and the memory controller; the cache line in the requesting processor will switch from the Invalid state to the Shared state, and the memory controller will pick up the value and store it in system memory during intervention. If, however, the requesting processing unit supports T-MESI, then the system logic will forward a tagged intervention response (it converts a modified intervention response from a non-compliant cache into a tagged intervention response); the cache line in the requesting processing unit will switch from Invalid to Tagged, and the memory controller will ignore the transaction. In either situation, the cache line in the sourcing processing unit switches from Modified to Shared. This construction allows computer systems to take advantage of the presence of any processing unit which supports the T-MESI protocol, regardless of the reason for mixing T-MESI and normal MESI caches. The selective implementation of the protocol could also be used for diagnostic purposes.

Apart from the use of a flag to selectively implement the Tagged state based on the requesting processor (heterogenous support), a system flag may be provided to enable or disable the Tagged state on a global basis, i.e., using a single-bit field in the system logic. For example, the master processor (requesting processor) may support the T-MESI protocol, but the system may want to bring the modified value downward in the memory hierarchy, e.g., to a vertical L3 cache.

As noted above, for those states and operations not shown in Tables 1 and 2, transitions and coherency responses are performed in accordance with the prior art MESI protocol. The following points might further be noted with respect to the T-MESI protocol as implemented in FIG. 3: an entry can only switch to the T state if it is currently in the Invalid state (if it was already in the Shared state, then it would just stay in the Shared state, and if one cache holds a value in the T state, it cannot be held in any other cache in either the M or E states); and a Tagged entry can only switch to Shared (upon a modified intervention response), to Invalid (upon deallocation or a DClaim push), or to Modified (if the same processor further modifies the already modified data).

With this new T-MESI protocol, the ownership of a block migrates to the last cache to read the data, which has the added benefit of staying most recently used and thereby lessening the chance of deallocation if a least recently used (LRU) cache replacement mechanism is employed. The "T" cache state can also be advantageously used for other applications, such as an intelligent input/output (I/O) controller interrupting the processor/cache which has most recently read a cached I/O status location, since this processor/cache would be most likely to have cached the I/O device driver code and, therefore, could execute the code faster than in another processor that needs to fetch the code into its cache. Of course, the present invention is particularly advantageous in that it allows sharing of data which has been modified and intervened.

Another aspect of the "T" state is that, when a cache line in this state is deallocated, the deallocation is made visible to all processors via the generalized interconnect. This visibility of the deallocation provides a further advantage in that it allows support for historical cache state information. Consider an example similar to that illustrated by Table 1, wherein three processors have respective cache lines which begin in Invalid states. When the first processor executes an RWITM operation, its cache line goes from Invalid to Modified, and when a second processor thereafter requests a read of the cache line, the first processor intervenes the data, switches its cache line to the Shared state, and the second processor's cache line goes from the Invalid state to the Tagged state (similar to the first three rows of Table 1). Now, however, the first processor has marked its cache line as having a special form of the Shared state, which can be referred to as "$S_T$" (Shared-Tagged). Then, if the third processor deallocates the cache line in the "T" state (e.g., via the LRU mechanism), the first processor is made aware of the deallocation and can respond by changing its cache line in the "$S_T$" state to a different state; this different state depends upon the particular implementation. For example, the Tagged cache line can be written to system memory, and the cache line in the "$S_T$" state can switch to a special state, referred to as the "R" state (Recently accessed), which can be used for intervention of shared data. The "R" state is discussed further below, and in U.S. patent application Ser. No. 08/839,557 filed Apr. 14, 1997, which is hereby incorporated.

In an alternative implementation, rather than writing the modified data value from the "T" state cache line to system memory upon deallocation, the cache line in the "$S_T$" state can simply revert to the "T" state, skipping the push of the value. There is also no need to copy the data from the Tagged cache block since the data in the Shared-Tagged block is the same; the cache state is just updated. These steps are illustrated in the first four rows of Table 3:

TABLE 3

|  | $P_0$ | $P_1$ | $P_2$ |
|---|---|---|---|
| Initial States | I | I | I |
| $P_0$ RWITM | M | I | I |
| $P_1$ Read | $S_T$ | T | I |
| $P_1$ LRU Deallocation | T | I | I |
| $P_1$ Read | $S_T$ | T | I |
| $P_2$ Read | S | $S_T$ | T |
| $P_2$ LRU Deallocation | S | T | I |
| $P_2$ Read | S | $S_T$ | T |

Use of the Shared-Tagged state thus allows the computer system to maintain intervention after deallocation of a Tagged cache line, thereby improving system performance.

The first four rows illustrate use of the "$S_T$" state stemming from conversion of a cache block in the "M" state, while the lower four rows of Table 3 illustrate how a Tagged cache block can also switch to Shared-Tagged. The fifth and sixth rows show the "T" state cache block migrating from processor to processor, with the cache block in processor $P_1$ switching from the "T" state to the "$S_T$" state; the cache block in processor $P_0$ which was previously Shared-Tagged switches to Shared. In the seventh row, the cache block in processor $P_2$ is deallocated, causing the cache block in processor $P_1$ to switch from the "$S_T$" state back to the "T" state. At this point in time, no cache block is in the "$S_T$" state, even though one is in the "S" state and another is in the "T" state (this condition can also occur if the Shared-Tagged cache line is deallocated earlier). Nevertheless, the "$S_T$" state can still re-appear, such as in the last row where processor $P_2$ requests another read.

This approach can be implemented by having the cache line in the "T" state broadcast an appropriate message indicating a desire to rely on a cache block in the "$S_T$" state to avoid a system memory write operation. If the message is received by a cache line in the "$S_T$" state, that cache line transmits an appropriate response, and the cache line in the "T" state is simply deallocated. If there is no response (i.e., no cache line in the "$S_T$" state), then the processor having the Tagged cache line must write the modified value to system memory upon deallocation.

In the foregoing implementations of the Shared-Tagged state, there is only one cache line that can be promoted to a different state upon deallocation of the Tagged cache line. In a more elaborate implementation, multiple levels of historical cache information can be provided. For example, instead of only one Shared-Tagged cache block existing at any given time, there can be multiple cache blocks in the Shared-Tagged state. This implementation can advantageously be achieved by applying a serial number to each Shared-Tagged cache according to its historical level, i.e., an "$S_{T1}$" state for the cache line that just sourced the data to the "T" cache line, an "$S_{T2}$" state for the cache line that previously sourced the data to the "$S_{T1}$" cache line, an "$S_{T3}$" state for the cache line that previously sourced the data to the "$S_{T2}$" cache line, etc. When a Tagged cache line is deallocated, all of the Shared-Tagged cache lines are then promoted by one level, as illustrated in Table 4:

TABLE 4

|  | $P_0$ | $P_1$ | $P_2$ | $P_3$ |
|---|---|---|---|---|
| Initial States | I | I | I | I |
| $P_0$ RWITM | M | I | I | I |
| $P_1$ Read | $S_{T1}$ | T | I | I |

TABLE 4-continued

|  | $P_0$ | $P_1$ | $P_2$ | $P_3$ |
|---|---|---|---|---|
| $P_2$ Read | $S_{T2}$ | $S_{T1}$ | T | I |
| $P_3$ Read | $S_{T3}$ | $S_{T2}$ | $S_{T1}$ | T |
| $P_3$ LRU Deallocation | $S_{T2}$ | $S_{T1}$ | T | I |

In the first three rows of Table 4, similar to Tables 1 and 3, the cache line of processor $P_0$ becomes Modified, then sources the value to the cache line of processor $P_1$ which becomes Tagged. The cache line in processor $P_0$ switches to Shared-Tagged 1st level. In the next two rows, the Tagged cache line migrates to processor $P_2$ and processor $P_3$, while the previous Tagged cache lines switch to Shared-Tagged 1st level. Any line that was Shared-Tagged 1st level switched to Shared-Tagged 2nd level and, in the fifth row, the line in processor $P_0$ switched from Shared-Tagged 2nd level to Shared-Tagged 3rd level. In the sixth row, the cache line is processor $P_3$ is deallocated by the LRU mechanism; the "$S_{T1}$" cache line in processor $P_2$ switches to the "T" state, the "$S_{T2}$" cache line in processor $P_1$ switches to the "$S_{T1}$" state, and the "$S_{T3}$" cache line in processor $P_0$ switches to the "$S_{T2}$" state.

Use of a serial identifier with the Shared-Tagged state levels again achieves improved performance in conjunction with an LRU deallocation mechanism since it lessens the likelihood that a cache line in a particular Shared-Tagged nth level state will be deallocated, and thus increases the overall likelihood that the modified value will remain in the horizontal cache structure. The only limit to the number of levels of historical cache information is the number of bits in the cache coherency state field for the cache line.

Figure 4:
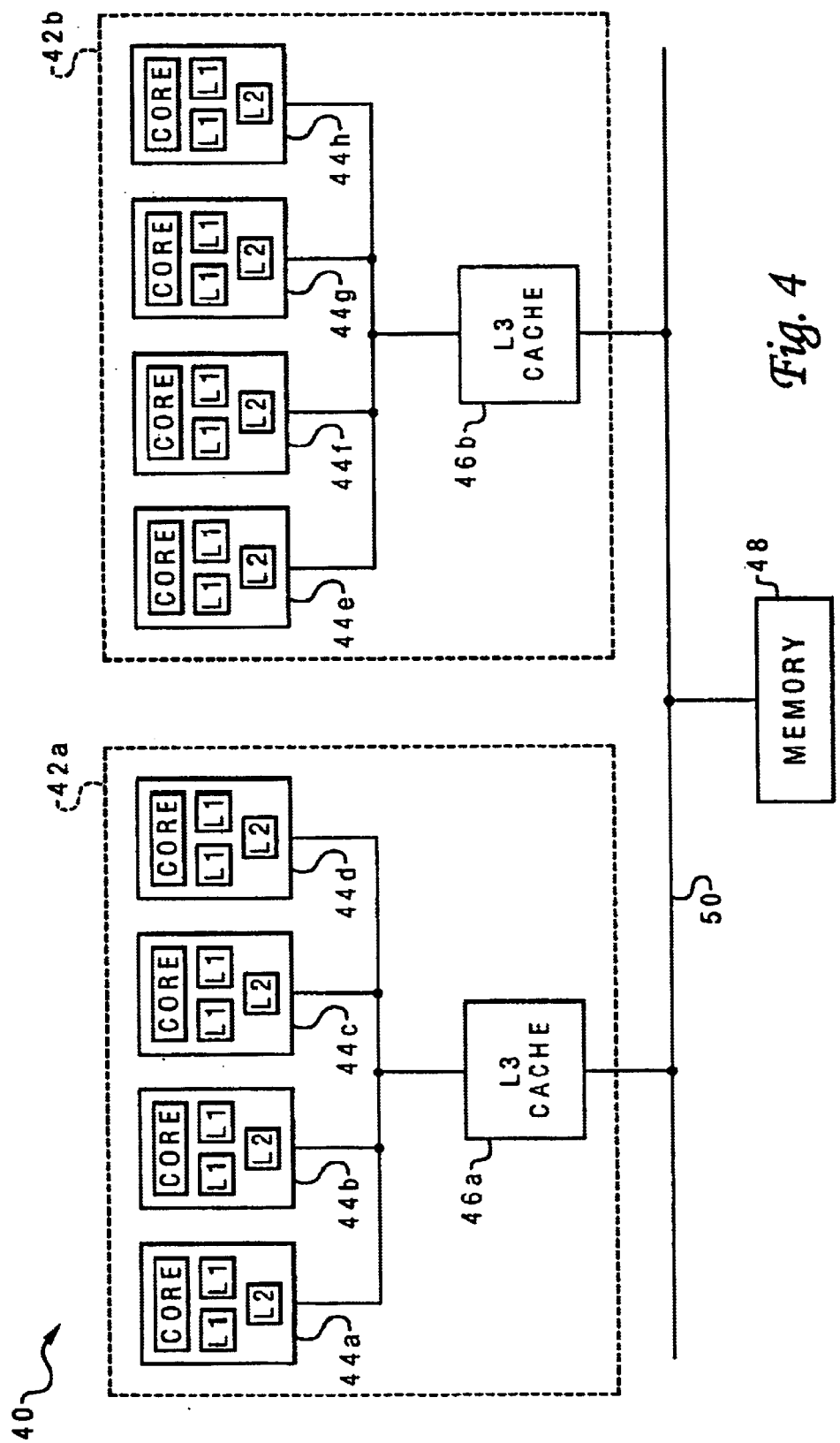
FIG. 4 is a block diagram of multi-processor computer system having a multilevel cache architecture which can be adapted to utilize the tagged coherency state of the present invention on both a global scale and a local (CPU cluster) scale.

The foregoing description of the invention is generally applicable to a cache architecture of any level, e.g., L2, L3, etc., but in the case of multiple level caches, the invention can be further advantageously applied with a slightly different model. Referring to FIG. 4, a multi-processor computer system 40 is shown which includes two CPU clusters 42a and 42b. CPU cluster 42a has four CPU's 44a, 44b, 44c, and 44d, each having a processor core with on-board (L1) instruction and data caches, and an L2 cache. The L2 caches of these four CPUs 44a, 44b, 44c, and 44d are connected to a shared L3 cache 46a, which is connected to the system memory (RAM) 48 via the generalized interconnect, or bus, 50. CPU cluster 42b similarly has four CPU's 44e, 44f, 44g, and 44h, each also having a processor core with on-board (L1) instruction and data caches, and an L2 cache. The L2 caches of these four CPUs 44e, 44f, 44g, and 44h are connected to another shared L3 cache 46b, which is again connected to memory 48 via bus, 50. In a hierarchical variation of the T-MESI protocol, up to three corresponding cache lines can be found in the Tagged state: one cache line among the L2 caches of CPUs 44a, 44b, 44c, and 44d; one cache line among the L2 caches of CPUs 44e, 44f, 44g, and 44h; and one cache line between the two L3 caches 46a and 46b.

Consider the following example, wherein all of the corresponding cache lines in CPUs 44a–44h begin in the Invalid state. Processor 44a executes an RWITM operation, and so its cache line (L2) goes from an Invalid state to a Modified state; the corresponding cache line in L3 cache 46a also goes from Invalid to Modified. Thereafter, processor 44b requests a read of the cache line; processor 44a intervenes and its cache line (L2) switches to the Shared state, while the cache line (L2) of processor 44b goes from the Invalid state to the Tagged state. The cache line in L3 cache 46a remains Modified. Later, processor 44e requests a read of the cache line; processor 44b intervenes, but its cache line (L2) remains in the Tagged state, since it is in a different CPU cluster from processor 44e. The cache line (L2) in processor 44e nonetheless switches from the Invalid state to the Tagged state. Also, since the intervened data has passed through both L3 caches, the cache line in L3 cache 46a switches from Modified to Shared, and the cache line in L3 cache 46b switches from Invalid to Tagged. Thereafter, if processor 44f requests a read of the cache line, it can be sourced by the cache line (L2) of processor 44e. In such a case, the cache line (L2) of processor 44e switches from the Tagged state to the Shared state, and the cache line (L2) of processor 44f switches from the Invalid state to the Tagged state. These steps are illustrated in Table 5:

TABLE 5

|  | $L2_{44a}$ | $L2_{44b}$ | $L2_{44e}$ | $L2_{44f}$ | $L3_{46a}$ | $L3_{46b}$ |
|---|---|---|---|---|---|---|
| Initial States | I | I | I | I | I | I |
| $P_{44a}$ RWITM | M | I | I | I | M | I |
| $P_{44b}$ Read | S | T | I | I | M | I |
| $P_{44e}$ Read | S | T | T | I | S | T |
| $P_{44f}$ Read | S | T | S | T | S | T |

In the last row of Table 5, each CPU cluster has one cache line in the "T" state, and one of the L3 caches has a line in the "T" state as well. This condition allows the modified data to be sourced at the L2 level from a local processor (i.e., one within the same cluster as the requesting processor), to further enhance performance. So if processor 44c thereafter requests a read of the cache line, this request will be filled by the cache line (L2) of processor 44b, but if processor 44g thereafter requests a read of the cache line, that request would be filled by the cache line (L2) of processor 44f; both operations would occur at the L2 level, without any action by L3 caches 46a and 46b. If more than two CPU clusters were provided, then the "T" cache line could similarly migrate among the additional L3 caches. This concept can be extended to cache architectures having even more than three cache levels (L1, L2, L3). The "T" state does not have to be implemented at all levels.

Figure 5:
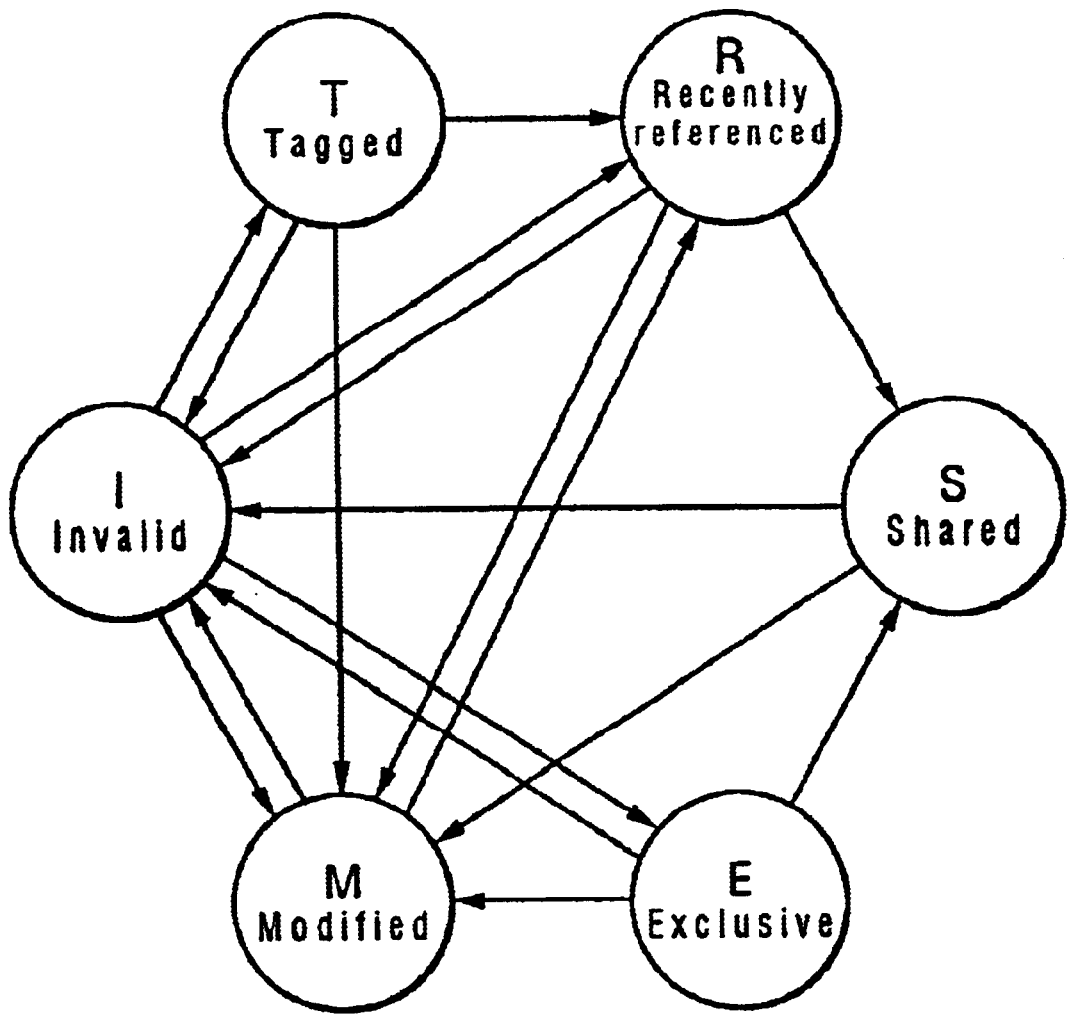
FIG. 5 is a state diagram depicting the cache coherency protocol of the present invention combined with a coherency protocol allowing identification of a cache line which has most recently read a value.

The present invention can also be combined with other variations of the MESI protocol, such as the R-MESI protocol mentioned above and discussed in the aforementioned U.S. patent application Ser. No. 08/839,557. According to that protocol, a Recent state is applied to the last cache which read shared data, allowing for a shared intervention response. A combination RT-MESI protocol can therefore be devised, and one embodiment is shown in FIG. 5. In this hybrid protocol, a cache line that is in the Tagged state can switch to the Recent state once the modified value is sourced to some other location in the memory hierarchy (i.e., to another cache or to system memory), and a cache line that is in the Modified state similarly switches to the Recent state upon sourcing to another location. An example is shown in Table 6:

TABLE 6

|  | $P_0$ | $P_1$ | $P_2$ |
|---|---|---|---|
| Initial States | I | I | I |
| $P_0$ RWITM | M | I | I |
| $P_1$ Read | R | T | I |
| $P_2$ Read | S | R | T |
| $P_2$ Deallocation | S | R | I |

In Table 6, all three corresponding cache lines in processors $P_0$, $P_1$ and $P_2$ begin in the invalid state and (similar to Table 1), when processor $P_0$ executes a RWITM on the corresponding memory block, its cache line becomes modified. When processor $P_1$ executes a read operation, its corresponding cache line still switches to Tagged, but the cache line in processor $P_0$ now switches to Recent, instead of Shared (the third row of Table 6). Thereafter, when processor $P_2$ executes a read operation, its cache line switches to Tagged, while the cache line of processor $P_1$ switches to Recent, and the cache line of processor $P_0$ switches to Shared (the fourth row of Table 6). Then, when processor $P_2$ deallocates the block (e.g., due to an LRU algorithm), processor $P_1$ still holds the value in the "R" state. In this manner, processor $P_1$ can source the value in the future through a shared intervention response. In another variation of this protocol, the Exclusive state can be omitted and effectively replaced by the Recent state.

Those skilled in the art will appreciate that more complex forms of the RT-MESI protocol are possible, such as a hybrid version using the aforementioned "$S_T$" state, wherein a cache line in the "$S_T$" state switches to the "R" state (instead of the "T" state) upon deallocation of the cache line presently holding the value in the "T" state, presuming that the value is written back to system memory. Similar embodiments could be devised using historical cache information provided by multiple Shared-Tagged states. Also, the RT-MESI protocol could be implemented with the global/local cache construction of FIG. 4. Consider, for example, the local cache of processing unit 44$d$ holding a value in the "M" state, and then sourcing the value to processing unit 44$h$. As before, the cache line in processing unit 44$h$ would switch from Invalid to Tagged, but now the cache line in processing unit 44$d$ can switch from Modified to Recent.

Both the "T" and "R" states provide a mechanism for uniquely identifying a cache block from among a group of cache blocks which are sharing a value. As noted, this aspect of these states makes it convenient to use the block for intervention. This unique marking of the block has other advantages. One relates to the DClaim operation previously mentioned. That operation can be issued practically simultaneously from many processors, leading to collisions. The "T" state may be used to assign a collision priority which overrides conflicting DClaim requests from other caches. By providing such a collision priority, the DClaim operation from the "T" state block can further be posted (e.g., placed in a cache operations queue for eventual broadcast to the remainder of the memory hierarchy), but the DClaim store instruction can be completed immediately, which contributes to overall faster operation of the system, as discussed in U.S. patent application Ser. No. 09/024,587.

While the "T" state may thus be advantageously used for (i) intervention of data, (ii) tracking responsibility for writing modified data to the memory hierarchy, and (iii) providing DClaim collision priority, these three functions need not be combined in a single coherency state. Table 7 below illustrates a more complicated coherency protocol in which these functions are independently carried out:

TABLE 7

| Cache Block | Possible States for Other Cache Blocks (Horizontal) |
| --- | --- |
| I | Q $Q_D$ $Q_T$ $Q_{DT}$ R $R_D$ $R_T$ $R_{DT}$ S $S_D$ $S_T$ $S_{DT}$ H M I |
| H | Q $Q_D$ $Q_T$ $Q_{DT}$ R $R_D$ $R_T$ $R_{DT}$ S $S_D$ $S_T$ $S_{DT}$ H M I |
| M | I |

TABLE 7-continued

| Cache Block | Possible States for Other Cache Blocks (Horizontal) |
| --- | --- |
| Q | R $R_D$ $R_T$ $R_{DT}$ S $S_D$ $S_T$ $S_{DT}$ H I |
| $Q_D$ | R $R_T$ S $S_T$ H I |
| $Q_T$ | R $R_D$ S $S_D$ H I |
| $Q_{DT}$ | R S H I |
| R | Q $Q_D$ $Q_T$ $Q_{DT}$ S $S_D$ $S_T$ $S_{DT}$ H I |
| $R_D$ | Q $Q_T$ S $S_T$ H I |
| $R_T$ | Q $Q_D$ S $S_D$ H I |
| $R_{DT}$ | Q S H I |
| S | Q $Q_D$ $Q_T$ $Q_{DT}$ R $R_D$ $R_T$ $R_{DT}$ S $S_D$ $S_T$ $S_{DT}$ H I |
| $S_D$ | Q $Q_T$ R $R_T$ S $S_T$ H I |
| $S_T$ | Q $Q_D$ R $R_D$ S $S_D$ H I |
| $S_{DT}$ | Q R S H I |

In Table 7, the column on the left indicates the state of a particular cache block, and the column on the right indicates the possible coherency states of corresponding blocks in other horizontal caches. This protocol variation provides fifteen coherency states, so four bits are required for the coherency field. The three above-noted functions are independently assigned as follows. First, any coherency state with the "D" subscript ($Q_D$, $Q_{DT}$, $R_D$, $R_{DT}$, $S_D$ or $S_{DT}$) is allowed to post a DClaim operation (i.e., such a block will have collision priority if conflicting DClaim requests arise). Secondly, any coherency state with the "T" subscript ($Q_T$, $Q_{DT}$, $R_T$, $R_{DT}$, $S_T$ or $S_{DT}$) is responsible for writing the modified value downward in the memory hierarchy. Thirdly, any "$R_{[X]}$" coherency state (R, $R_D$, $R_T$ or $R_{DT}$) is entitled to intervene the value. The "$Q_{[X]}$" coherency states (Q, $Q_D$, $Q_T$ or $Q_{DT}$) are used to provide intervention when no "$R_{[X]}$" state is present, i.e., the "$R_{[X]}$" states allow primary intervention, and the "$Q_{[X]}$" states (historical) allow secondary intervention. The "H" state is the Hover state mentioned below. This embodiment does not use the "E" state.

The three noted functions are independently implemented, but can nevertheless be combined in particular coherency states. The two functions of intervention and write-back responsibility are combined in the states $R_T$ and $Q_T$. The two functions of intervention and DClaim priority are combined in the states $R_D$ and $Q_D$. The two functions of write-back responsibility and DClaim priority are combined in the states $S_{DT}$. All three functions are combined in the states $Q_{DT}$ and $R_{DT}$. The independence of these three functions can be controlled by setting system bits using a data flow engine. This concept can also be applied to the caches supporting clustered CPUs Finally, the present invention is also particularly compatible with the use of "cross-bars." Prior art cache designs use both an address cross-bar and a data cross-bar to enhance communications. Generally, caches do not have point-to-point communications, but must issue requests and responses in a broadcast manner to other locations in the memory hierarchy. Cross-bars are simply switches or relays that direct the requests and responses to different paths on the bus, in order to make more efficient use of the bus. In other words, all of the caches are interconnected to the cross-bar, and it maintains a queue so that the cache operations can be distributed evenly among the various paths in the bus, creating significantly more bus bandwidth. The system controller may control the cross-bars. A given cache (e.g., L2) must inform the cross-bar controller that the cache should see operations regarding a given tag.

The T-MESI protocol is useful in conjunction with cross-bars since certain address and data operations may be presented only to the devices which require these operations.

Consider the example of four processing units, with one having a cache block in the "T" state, another having the corresponding block in the "ST" state, and the other two having corresponding blocks in the "I" state. When one of the latter two processors requests a read of the value, system logic can determine that the highest priority response (tagged intervention) should only be sent to three of the four processors. Therefore, this address operation is not presented to the fourth processor (the non-requesting processor with its block in the "I" state). Similarly, the data cross-bar can be used to present the value itself only to the requesting processor. If a priority scheme is used wherein the tagged intervention response overrides a retry response, then the response might need to be presented to the retrying processor.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, this protocol can be combined with cache coherency protocols other than the R-MESI protocol; U.S. patent application Ser. No. 09/024,610 describes an "H-MESI" protocol wherein a cache line operates in a "Hover" state to wait for transmission of valid data, and the H-MESI protocol could be combined with the present T-MESI protocol, such as by having a cache line in the "H" state switch to an "$S_T$" state when the Hover cache line loads the valid data. It is therefore contemplated that such modifications can be made without departing from the spirit or scope of the present invention as defined in the appended claims.

What is claimed is:

1. A method of improving memory latency associated with a read-type operation in a multi-processor computer system having a plurality of processing units, each processing unit further having an associated cache, the method comprising the steps of:

a requesting processing unit issuing a message to an interconnect of the computer system, indicating that the requesting processing unit desires to read a value from an address of a memory device of the computer system;

each cache snooping the interconnect to detect the message;

each cache transmitting a response to the message, wherein a tagged intervention response is transmitted from a responding cache to indicate (i) that the responding cache contains a modified value corresponding to the address of the memory device that has not been written to the memory device, (ii) that the responding cache shares the modified value with at least one other cache of an adjacent processing unit, and (iii) that the responding cache will exclusively source the value;

associating a priority with each response from each cache;

detecting each response and its associated priority; and forwarding a response with a highest priority to the requesting processing unit.

2. The method of claim 1 wherein the tagged intervention response is assigned a highest priority.

3. The method of claim 1 wherein an invalid response is transmitted to indicate that a cache does not contain any value corresponding to the address of the memory device.

4. The method of claim 1 wherein a modified intervention response is transmitted to indicate that a cache containing the value as modified by the processing unit associated with that cache, can source the value.

5. The method of claim 1 wherein a shared response is transmitted to indicate that a cache containing a shared copy of the modified value will not source the value.

6. The method of claim 1 wherein a retry response is transmitted to indicate that a cache desires the requesting processor to re-issue the message.

7. The method of claim 1 wherein:

an invalid response is transmitted to indicate that a cache does not contain any value corresponding to the address of the memory device;

a modified intervention response is transmitted to indicate that a cache containing the value as modified by the processing unit associated with that cache, can source the value;

a shared response is transmitted to indicate that a cache containing a shared copy of the modified value will not source the value; and a retry response is transmitted to indicate that a cache desires the requesting processor to re-issue the message.

8. The method of claim 6 wherein the retry response is assigned a highest priority.

9. The method of claim 7 wherein the tagged intervention response is assigned a highest priority.

10. The method of claim 7 wherein the retry response is assigned a highest priority.

11. A computer system comprising:

a memory device;

an interconnect connected to said memory device;

a plurality of processing units connected to said interconnect, each processing unit having a cache for storing values from said memory device, each cache having means for transmitting a response to a message issued from a requesting processing unit, the message indicating that said requesting processing unit desires to read a value corresponding to an address of said memory device, wherein said transmitting means includes means for providing a tagged intervention response to indicate that a cache containing a modified value corresponding to said address of said memory device that has not been written to the memory device will exclusively source the modified value, wherein the cache containing the modified value shares the modified value with at least one other cache of an adjacent processing unit, each said response further having an associated priority; and means for detecting each response and its associated priority, and forwarding a response with a highest priority to said requesting processing unit.

12. The computer system of claim 11 wherein each said cache includes means for snooping said interconnect for a message from said requesting processing unit.

13. The computer system of claim 11 wherein said tagged intervention response is assigned a highest priority.

14. The computer system of claim 11 wherein said transmitting means further includes means for providing an invalid response to indicate that a cache does not contain any value corresponding to said address.

15. The computer system of claim 11 wherein said transmitting means further includes means for providing a modified intervention response to indicate that a cache containing the value as modified by the processing unit associated with that cache, can source the value.

16. The computer system of claim 11 wherein said transmitting means further includes means for providing a shared response to indicate that a cache containing a shared copy of the modified value corresponding to said address will not source the value.

17. The computer system of claim 11 wherein said transmitting means further includes means for providing a retry response to indicate that a cache desires said requesting processor to re-issue the message.

18. The computer system of claim 11 wherein said transmitting means further includes means for providing:

an invalid response to indicate that a cache does not contain any value corresponding to said address;

a modified intervention response to indicate that a cache containing the value as modified by the processing unit associated with that cache, can source the value;

a shared response to indicate that a cache containing a shared copy of the modified value corresponding to said address will not source the value; and a retry response to indicate that a cache desires said requesting processor to re-issue the message.

19. The computer system of claim 18 wherein said tagged intervention response is assigned a highest priority.

20. The computer system of claim 18 wherein said retry response is assigned a highest priority.

* * * * *